(12) United States Patent
Pargansky et al.

(10) Patent No.: US 8,820,777 B1
(45) Date of Patent: Sep. 2, 2014

(54) COLLAPSIBLE VALET CART

(71) Applicants: Richard Pargansky, Bridgewater, NJ (US); Tudor Agapescu, Ringwood, NJ (US)

(72) Inventors: Richard Pargansky, Bridgewater, NJ (US); Tudor Agapescu, Ringwood, NJ (US)

( * ) Notice: Subject to any disclaimer, the term of this patent is extended or adjusted under 35 U.S.C. 154(b) by 0 days.

(21) Appl. No.: 13/938,443

(22) Filed: Jul. 10, 2013

(51) Int. Cl.
*B62B 1/00* (2006.01)
*B62B 3/14* (2006.01)
*B62B 3/02* (2006.01)

(52) U.S. Cl.
CPC ................ *B62B 3/146* (2013.01); *B62B 3/022* (2013.01)
USPC .......................................... 280/651; 280/652

(58) Field of Classification Search
CPC .................................... B62B 1/00; B62B 3/02
USPC ........ 280/651, 652, 638, 639, 655, 42, 47.35, 280/47.26
See application file for complete search history.

(56) References Cited

U.S. PATENT DOCUMENTS

| | | | | |
|---|---|---|---|---|
| 2,564,939 A * | 8/1951 | Weast | ........................ | 280/652 |
| 4,824,137 A * | 4/1989 | Bolden | ........................ | 280/652 |
| 4,826,202 A * | 5/1989 | Morrissette | ................... | 280/652 |
| 5,380,022 A * | 1/1995 | Dennis | ....................... | 280/47.35 |
| 5,562,299 A * | 10/1996 | Morrissette | ................... | 280/652 |
| 6,073,943 A * | 6/2000 | Serrault | ..................... | 280/47.26 |
| 6,349,962 B1 * | 2/2002 | Johanson | ...................... | 280/651 |
| 6,685,199 B2 * | 2/2004 | Stravitz et al. | .................. | 280/42 |
| 7,147,243 B2 * | 12/2006 | Kady | ........................... | 280/655 |
| 7,731,221 B2 * | 6/2010 | Bess | ............................ | 280/651 |
| RE41,763 E * | 9/2010 | Ng | ................................ | 211/149 |
| 8,393,634 B2 * | 3/2013 | Radlow et al. | ............... | 280/651 |
| 8,672,147 B2 * | 3/2014 | Lam | ............................. | 211/149 |

* cited by examiner

*Primary Examiner* — Hau Phan

(57) ABSTRACT

A portable, foldable clothes rack and table serving cart is provided, including a frame on wheels, a hanger bar for handing clothes placed on hangers, a laundry basket platform to support a laundry basket full of clothes, and a table serving cart all of which can be compactly folded and stored neatly between a clothes washer and dryer essentially out of sight.

6 Claims, 12 Drawing Sheets

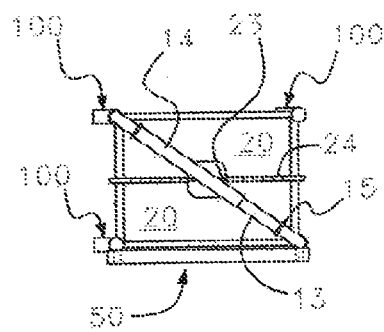
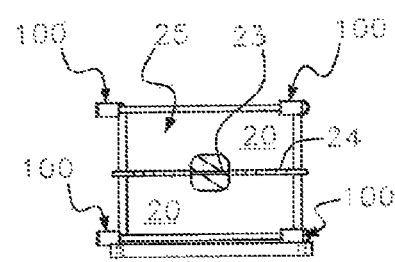
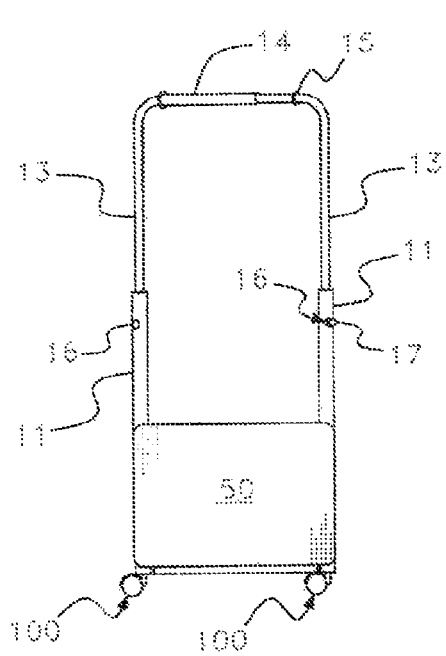
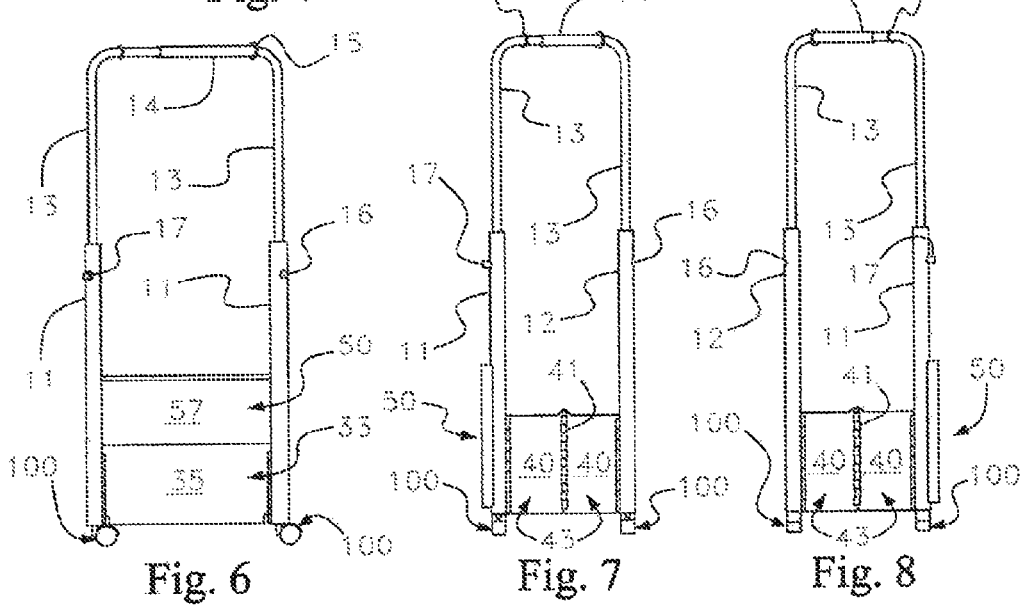

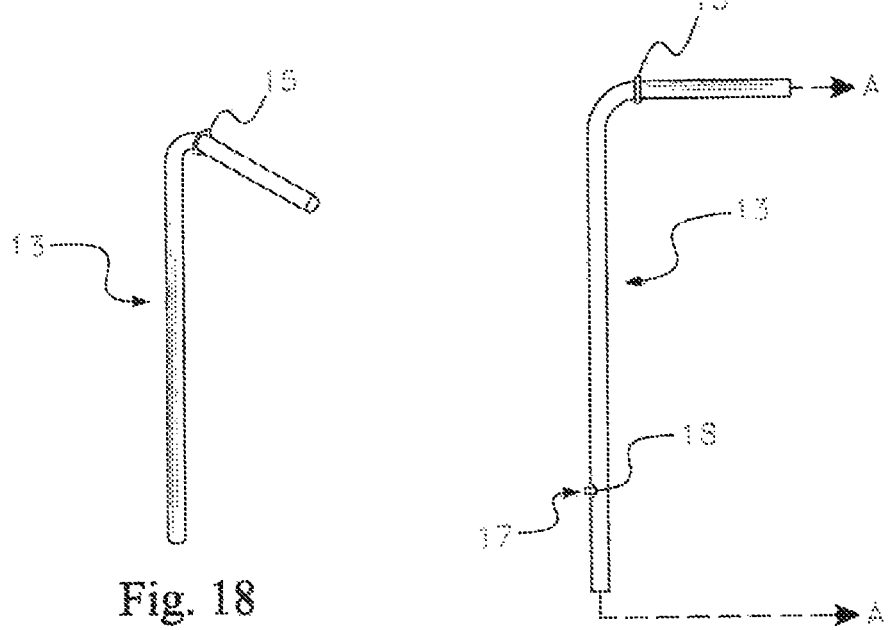
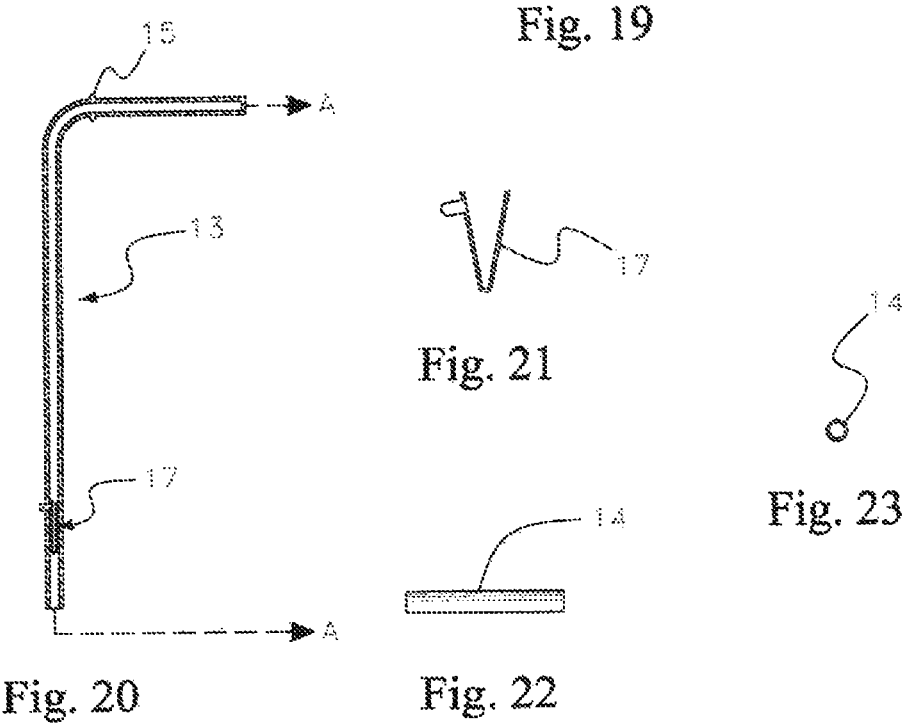
Fig. 18
Fig. 19
Fig. 20
Fig. 21
Fig. 22
Fig. 23

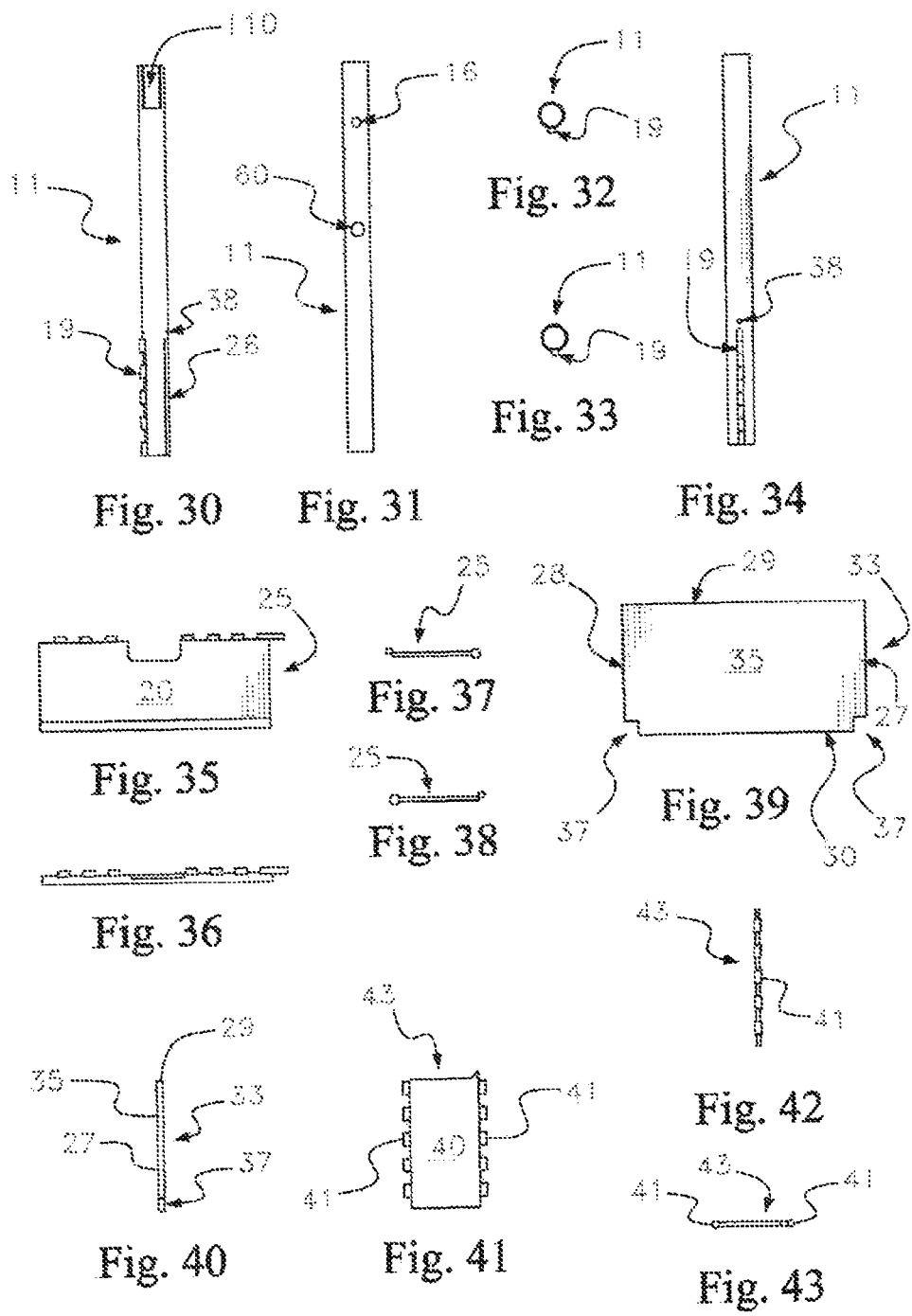

US 8,820,777 B1

COLLAPSIBLE VALET CART

FIELD OF THE INVENTION

The invention disclosed herein relates generally to collapsible carts, and more specifically to collapsible laundry carts with telescoping valet arms for hanging clothing, a laundry basket platform, and a removable folding or serving table top.

BACKGROUND OF THE INVENTION

People removing laundry from a dryer at the end of a machine laundry cycle typically choose to either place clothing items such as shirts and pants directly onto clothes hangers for immediate hanging to reduce wrinkling, or to fold items of clothing or bathroom linens for placement in a drawer or linen closet. To perform these functions, users require hanging rods or valets on which to place hangers. A flat surface to hold a laundry basket of soiled or clean folded clothes is also required. People also utilize laundry baskets or carts on wheels to transport soiled laundry to a washing machine or for placement of freshly laundered and folded items.

Prior art to aid in hanging freshly laundered items consists of floor stands that take up floor space and do not provide for convenient storage when not needed, and which do not provide for a flat surface for folding other non-hanging items or to hold a laundry basket. Such floor stands are bulky and sometimes unstable. Prior art also consists of wall mounted or floor mounted racks that protrude permanently into view and take up valuable space in a laundry room. Prior art also consists of table carts that fold into a more compact configuration for storage.

Prior art also disclose folding tables and surfaces without the addition of stand-alone carts that can be used as a serving cart. Most prior devices require folding and collapsing on a flat, horizontal surface, such as a floor space, rather than from a vertical position, retaining an upright position, and also require performing multiple steps to achieve the desire collapsed position.

SUMMARY OF THE INVENTION

The invention disclosed herein solves the problem of portability, collapsibility and functionality missing in the prior art. The invention proposed here consists of a valet cart that folds into a more compact configuration for storage but it also transforms into an additional and unexpected configuration for a completely different purpose, that purpose being to provide a portable structure to assist in doing the laundry. In the newly transformed configuration, it provides for the hanging of dried clothes removed from the clothes dryer that are hung on hangers. It also provides for the placement of a laundry basket full of clean or soiled clothes. The clothes hung on hangers and the laundry basket of clothes can now be transported to bedrooms or closets at any desired location. When no longer required for laundry purposes, it can transform back into a table top cart configuration or compactly folded and stored until further use.

There are three configurations and a number of aspects to the present invention. In one configuration, it can be compactly folded and stored neatly between a clothes washer and dryer, essentially out of sight. This is particularly handy in a storage area for ease of access when washing and drying clothes.

A second configuration transforms from a compactly folded configuration to that of a portable and stable table top cart on wheels. The table top cart configuration can be useful in the kitchen, dining room, outside patio, and elsewhere. The table top can be designed to include a circumferential raised wall to allow the cart to alternatively be utilized as a serving cart in a dining room A third configuration includes the ability to remove the top and to raise telescoping valet arms that provide a stable horizontal rod for hanging freshly laundered clothing on clothes hangers. In this configuration the device also provides a horizontal platform onto which a laundry basket full of soiled or clean folded clothes can be placed.

Another aspect is the inclusion of casters for ease of moving around the house. The entire unit can be wheeled to the bedrooms of the house, for example, and the clothes on hangers can be placed in closets and folded clean clothes placed in drawers. Towels and linens can be wheeled to a linen closet.

Another aspect of the invention is that it can also serve as an auxiliary closet to hang the coats of visitors after the house closet space is exhausted. This clothes hanging configuration can be reconfigured to the table top cart configuration and ultimately to the compactly folded configuration if no longer required for use.

BRIEF DESCRIPTION OF THE DRAWINGS

For a more complete understanding of the present invention, reference is made to the following detailed description of the exemplary embodiment(s) considered in conjunction with the accompanying drawing in which:

FIG. 3 is a top plan view of the collapsible valet cart showing the valet arm in an extracted position;

FIG. 4 is a bottom plan view of the collapsible valet cart showing the valet arm in an extracted position;

FIG. 5 is a front elevational view of the collapsible valet cart showing the valet arm in an extracted position;

FIG. 6 is a rear elevational view of the collapsible valet cart showing the valet arm in an extracted position;

FIG. 7 is a right side elevational view of the collapsible valet cart showing the valet arm in an extracted position;

FIG. 8 is a left side elevational view of the collapsible valet cart showing the valet arm in an extracted position;

FIG. 18 is a perspective view of the retractable valet arm of the collapsible valet cart;

FIG. 19 is a left elevational view of the retractable valet arm of the collapsible valet cart, the right elevational view being a mirror image thereof;

FIG. 20 is cross-sectional view of the retractable valet arm of the collapsible valet cart taken through line A-A.

FIG. 21 is a perspective view of a button clip of the collapsible valet cart;

FIG. 22 is a right side elevational view of the valet arm sleeve of the collapsible valet cart, a left side elevational view being a mirror image thereof;

FIG. 23 is a front elevational view of the valet arm sleeve of the collapsible valet cart, a rear elevational view being a mirror image thereof;

FIG. 30 is a front elevational view of a vertical support tube of the collapsible valet cart;

FIG. 31 is a rear elevational view of a vertical support tube of the collapsible valet cart;

FIG. 32 is a top plan view of a vertical support tube of the collapsible valet cart;

FIG. 33 is a bottom plan view of a vertical support tube of the collapsible valet cart;

FIG. 34 is a right side elevational view of a vertical support tube of the collapsible valet cart, a left side elevational view being a mirror image thereof;

FIG. 35 is a top plan view of one of the upper platform plates of the collapsible valet cart, a bottom plan view being a mirror image thereof;

FIG. 36 is a rear plan view of one of the upper platform plates of the collapsible valet cart;

FIG. 37 is a right side elevational view of one of the upper platform plates of the collapsible valet cart;

FIG. 38 is a left side elevational view of one of the upper platform plates of the collapsible valet cart;

FIG. 39 is a front elevational view of a front wall of the collapsible valet cart, a rear elevational view being a mirror image thereof;

FIG. 40 is a right side elevational view of the front wall of the collapsible valet cart, a left side elevational view being a mirror image thereof;

FIG. 41 is a front elevational view of a side wall of the collapsible valet cart, a rear elevational view being a mirror image thereof;

FIG. 42 is a right side elevational view of a side wall of the collapsible valet cart, a left side elevational view being a mirror image thereof; and FIG. 43 is a top plan view of a side wall of the collapsible valet cart, a bottom plan view elevational view being a mirror image thereof.

DETAILED DESCRIPTION OF THE DRAWINGS

Figure 1:
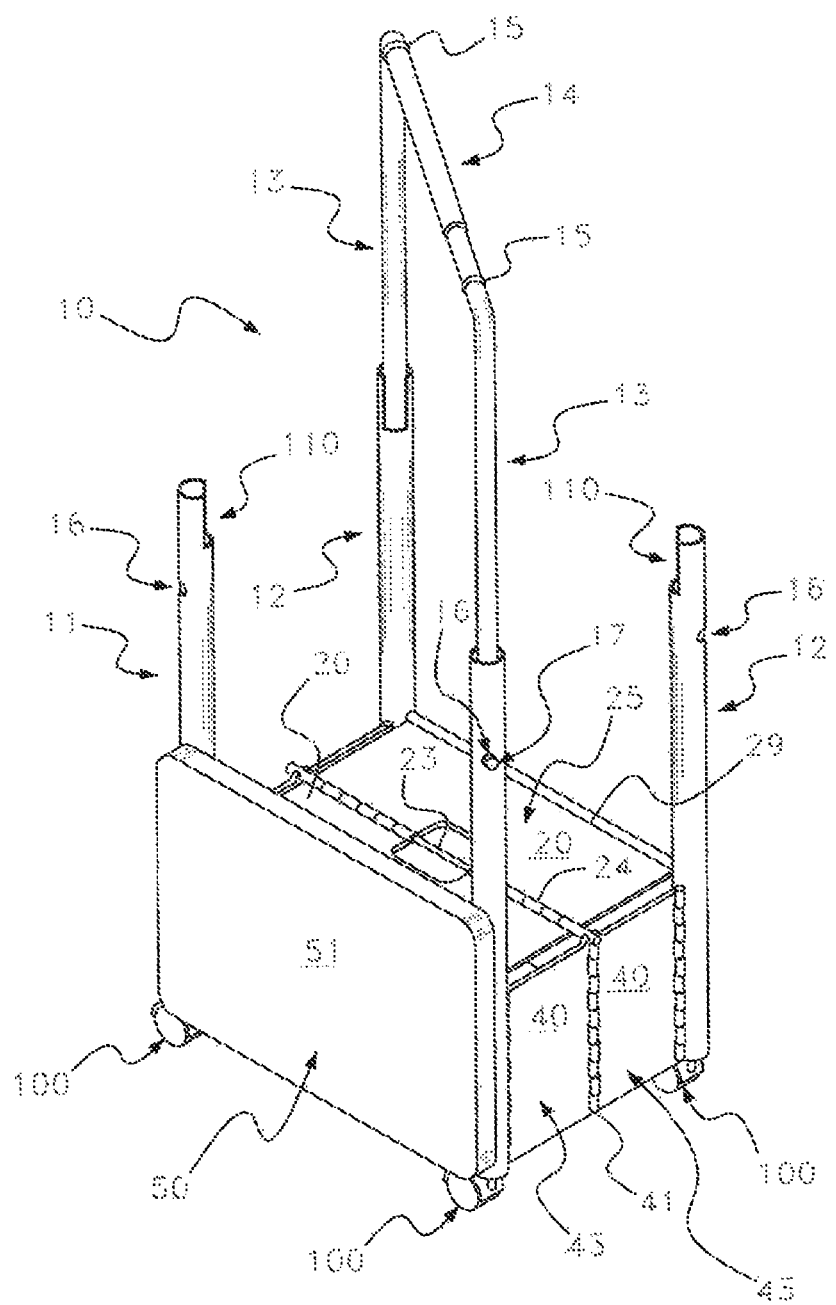
FIG. 1 is a perspective view of the collapsible valet cart showing the valet arm in an extracted position.

Referring to FIGS. 1-43, a collapsible valet cart 10, constructed in accordance with the present invention, is shown to include front vertical support tubes 11, rear vertical support tubes 12, front and rear walls, 33, four folding side walls, 43, a basket platform 25 comprised of a pair of hinged platform plates 20, a storable table top 50, two telescoping valet arms 13, a valet arm sleeve 14, within which the valet arms 13 slidingly engage during the storage or operation process, and a set of casters 100 for easy and convenient wheeling the collapsible valet cart 10 from room to room.

The front vertical support tubes 11 are positioned to form an essentially rectangular array in conjunction with the rear vertical support tubes 12 to generate a closed loop peripheral frame with sliding attachment to the front and rear walls 33, and hinged attachments to the four side walls 43 by means of side wall hinge pins 42 and side wall hinges 41. As shown more clearly in FIGS. 30-34, the two front vertical support tubes 11 are elongated hollow legs each of which includes hinges 19 at a lower distal edge for attachment to one edge of one of the four side walls 43 by means of the side wall hinge pins 42 and side wall hinges 41. Each of the two front vertical support tubes also includes an annular table hanging pin 60, and a valet cut out 110 located at an upper distal edge. The two rear vertical support tubes 12 are identical to the two front vertical support tubes 11 with the exception that they do not include the uniformly molded annular table hanging pins 60. Each of the front vertical support tubes 11 and the rear vertical support tubes 12 include a vertical elongated channel 26 into which the front and rear walls 33 slidingly and removably engage.

Figure 2:
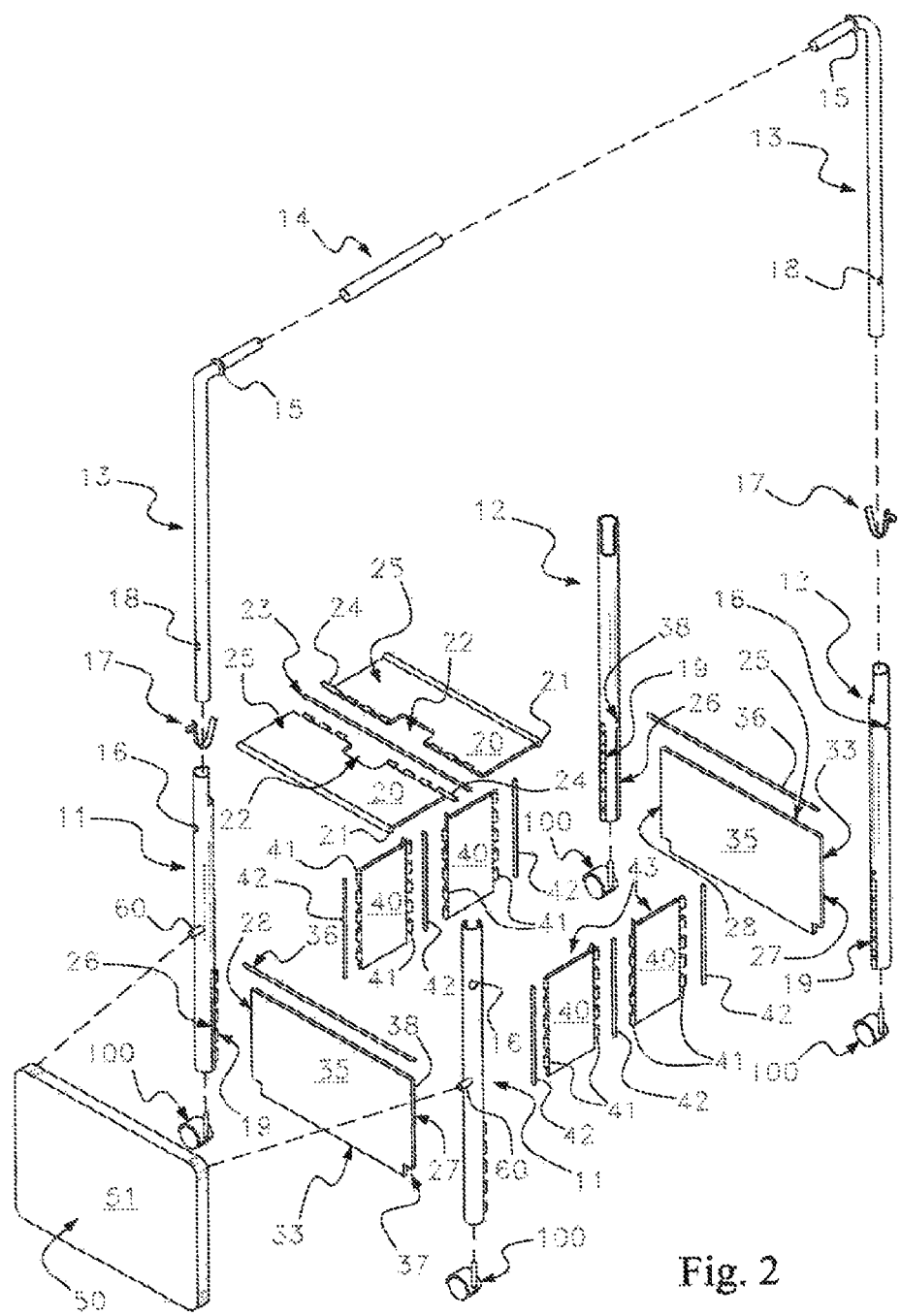
FIG. 2 is an exploded view of the collapsible valet cart.

Referring now to FIGS. 2 and 39-40, the front and rear walls 33 are each substantially rectangular in shape with a front surface 35, a rear surface 36, a left edge 28, a right edge 27 opposite the left edge 28, and a pair of substantially square shaped notches 37 located at the lower distal edges of the left and right edges 28, 27. The notches 37 have upper and lower sides that are approximately equal to the inside diameter of the vertical support tubes 11, 12. The front and rear walls 33 have a vertical height less than half of that of vertical support tubes 11, 12. The left edge 28 and the right edge 27 slidingly and matingly engage with the vertical elongated channels 26 of the front and rear vertical support tubes 11, 12 such that they remain securely within the vertical elongated channels 26 from the tight fit of the parts.

Figure 11:
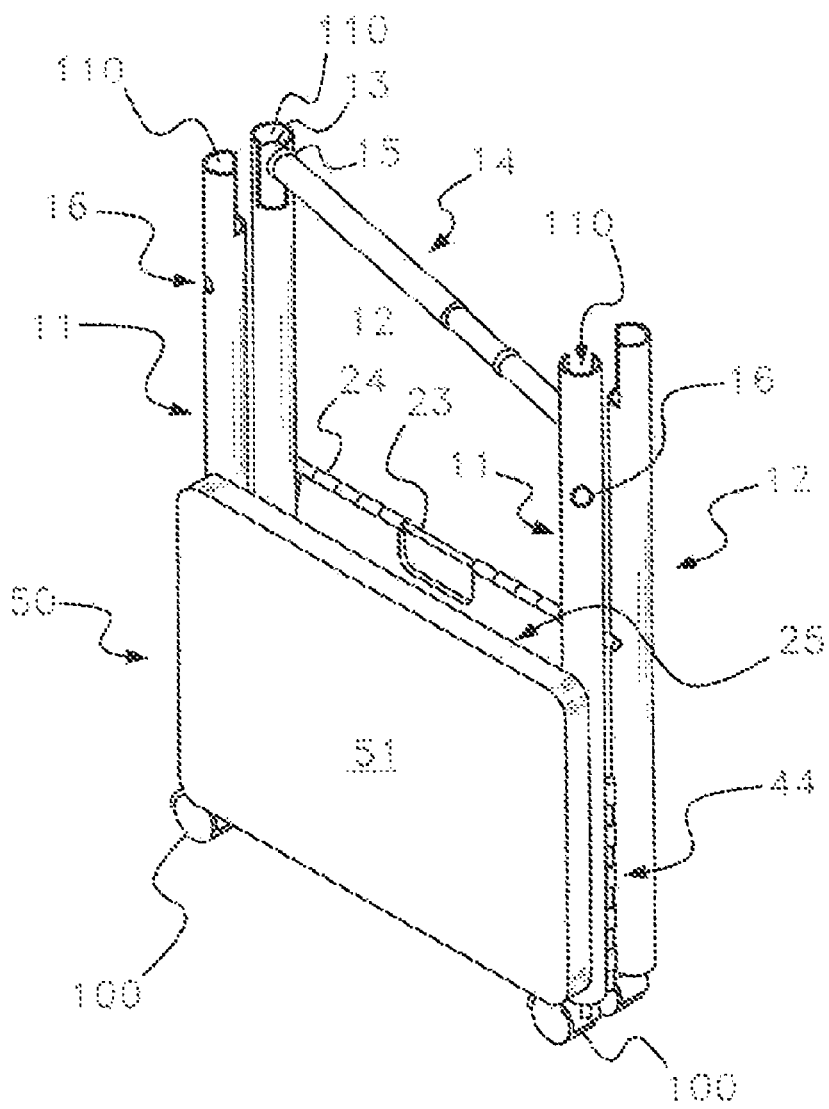
FIG. 11 is a front perspective view of the collapsible valet cart showing the invention in a fully folded position.
Figure 12:
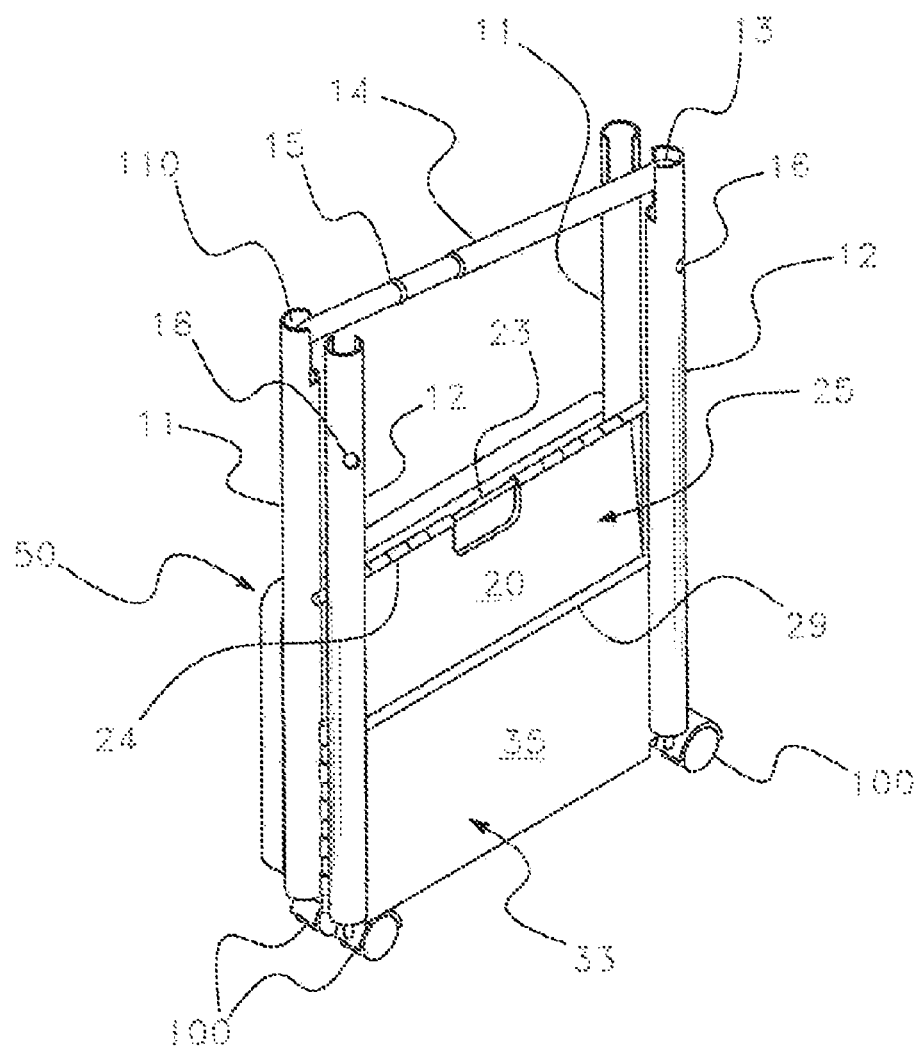
FIG. 12 is a rear perspective view of the collapsible valet cart showing the invention in a fully folded position.
Figure 13:
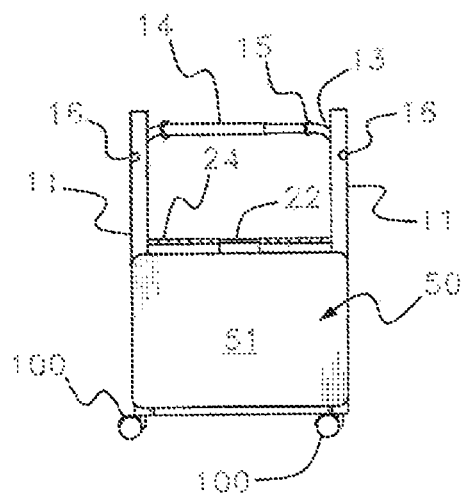
FIG. 13 is a front elevational view of the collapsible valet cart showing the invention in a fully folded position.
Figure 14:
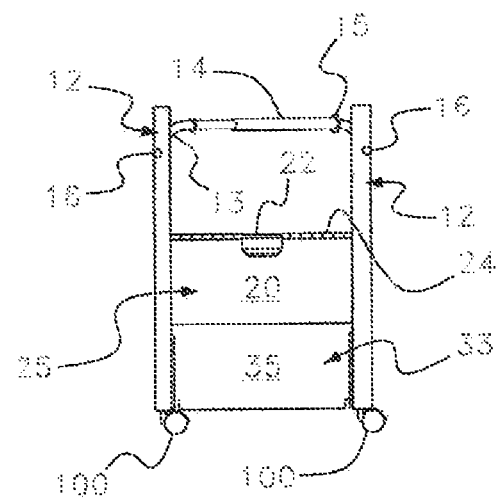
FIG. 14 is a rear elevational view of the collapsible valet cart showing the invention in a fully folded position.
Figure 15:
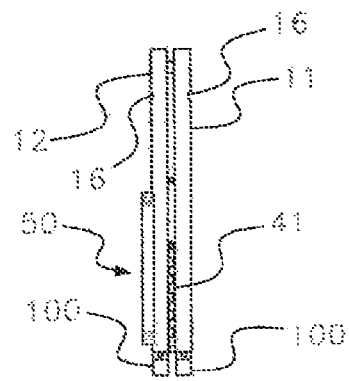
FIG. 15 is a right side elevational view of the collapsible valet cart showing the invention in a fully folded position.
Figure 16:
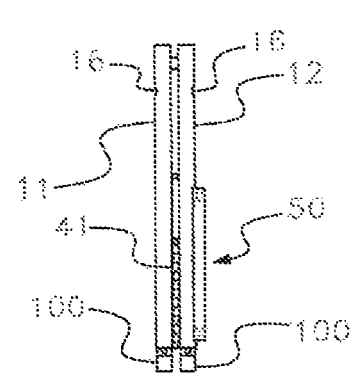
FIG. 16 is a left side elevational view of the collapsible valet cart showing the invention in a fully folded position.
Figure 17:
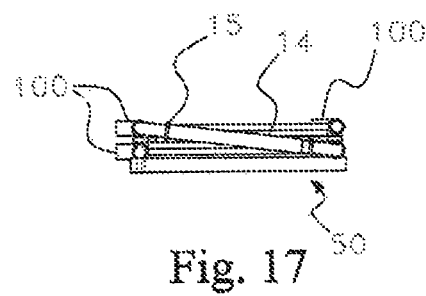
FIG. 17 is a top plan view of the collapsible valet cart showing the invention in a fully folded position.
Figure 24:
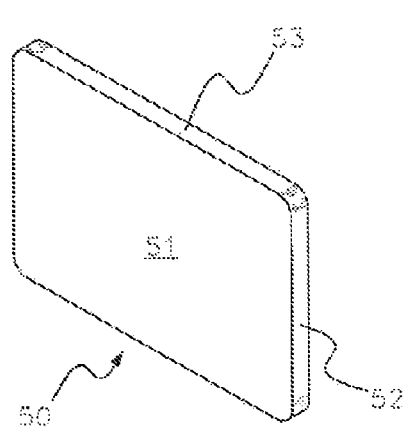
FIG. 24 is a perspective view of the removable table top of the collapsible vale cart.
Figure 25:
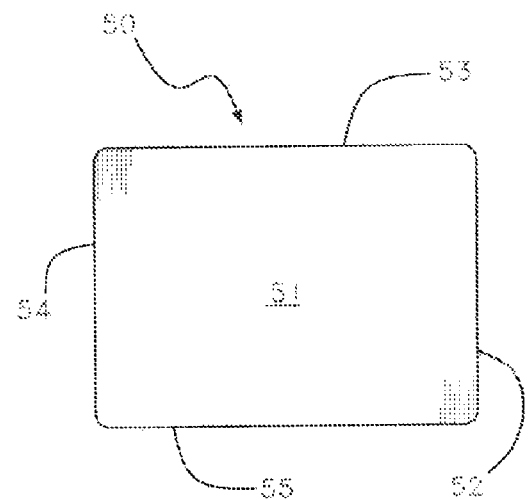
FIG. 25 is a top plan view of the removable table top of the collapsible valet cart.
Figures 26, 27:
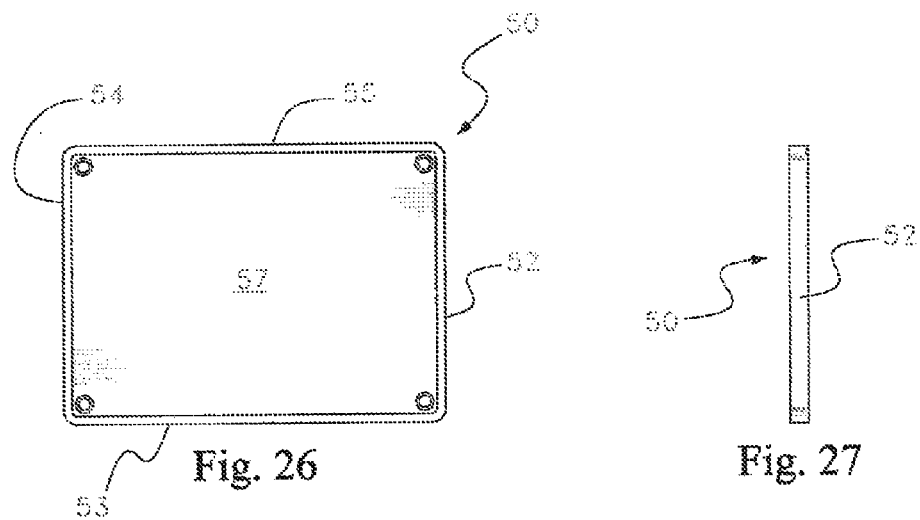
FIG. 26 is a bottom plan view of the removable table top of the collapsible valet cart.
FIG. 27 is a right side elevational view of the removable table top of the collapsible valet cart, a left side elevational view being a mirror image thereof.
Figure 28:
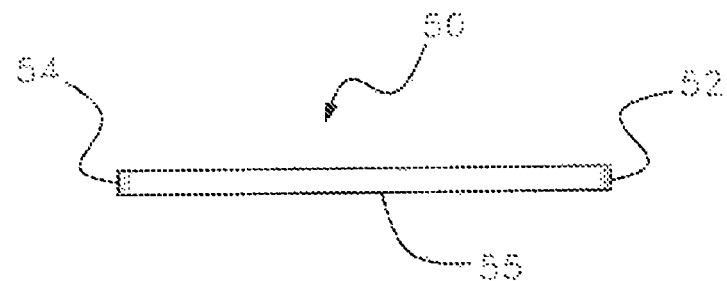
FIG. 28 is a front elevational view of the removable table top of the collapsible valet cart, a rear elevational view being a mirror image thereof.
Figure 29:
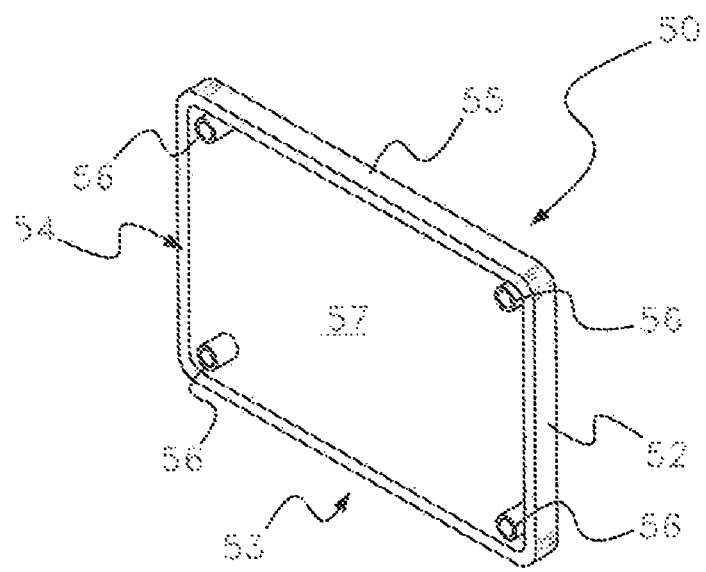
FIG. 29 is a bottom perspective view of the removable table top of the collapsible valet cart.

Referring now to FIG. 2 and FIGS. 41-43, each of the four side walls 43 is essentially a flat rectangular plate 40 with hinges 41 along the longer side edges. The hinges 41 of the four side walls 43 attach to each other and to the hinges 19 of the vertical support tubes 11, 12 by hinge pins 42. The four side walls 43 are designed to be the same height as the front and real walls 33. The coupling of the side walls 43 to each other allows for the collapsible valet cart 10 to fold as the side walls 43 can rotate with respect to each other along their hinges 41, to essentially face each other as they hingedly rotate toward the center line of the collapsible valet cart 10 in an inward manner as shown in FIGS. 11-12 for storage.

As shown in FIGS. 1-2, the vertical support tubes 11, 12 are also attached to a basket platform 20 which is configured with a pair of platform plates 25 which reside horizontally and perpendicularly with respect to the front and rear walls 33, as well as with respect to the side walls 43 when the collapsible valet cart 10 is fully expanded out of its storage position. The platform plates 25 are designed to provide a flat, horizontal surface onto which a laundry basket can be placed if desired.

As shown more clearly in FIGS. 2 and 35-38, each of the platform plates 25 has a flattened center 20 and a platform hinge 24 along one edge such that the platform plates 25 are rotatingly and hingedly affixed to each other by means of the platform plate hinges 24 and a platform plate hinge pin 23. Each of the platform hinges 24 is discontinuous to form a platform plate cut out 22 wherein the plate hinge pin 23 is exposed at the cut out 22, and thus also serves as the collapsible valet cart 10 folding handle. The platform plates 25 affix to the vertical support tubes 11, 12 by means of platform plate pins 36 that pass through a channel 21 designed along outer walls of the platform plates 25 and rotatingly mate with a plate hole 38 in each of the vertical support tubes 11, 12.

As shown in FIGS. 18-23, the collapsible valet cart is designed to include a means for hanging clothes on hangers by including a pair of hollow, annular L-shaped valet arms 13. Each valet arm 13 consists of a vertical section that can be extended upwardly in a telescoping manner from a storage position within the hollow vertical support tubes 11, 12. Each valet arm 13 bends at an essentially ninety degree angle from the vertical section to form horizontal sections. The lower distal ends of the valet arms 13 are slidingly positioned into the vertical support tubes 11, 12 opposite to each other on a diagonal direction.

As shown in FIGS. 20-21, a button clip 17 is fixed by tension within each of the valet arms 13 at a location to allow the button clip to pass through the valet rod hole 18. The button clip 17 is essentially V-shaped with a rounded button that can be pressed inwardly to allow the valet arm 13 to slidingly engage within the vertical support tubes 11, 12, and then to lock each of the valet arms 13 in place when the button clip passes through a similar hole 16 in the vertical support tubes 11, 12, in a manner well-known and used extensively for telescoping poles.

Each of the valet arms, 13, is also designed to include a uniformly molded stopping flange 15, located proximately near the ninety degree bend. The stopping flange 15 has a diameter larger than that of the valet arm 13 and is designed to releasably engage with clothes hangers to prevent them from sliding off the valet arm 13.

The horizontal distal ends of the valet arms 13 slidingly engage with a hollow valet arm sleeve 14 which can be used to pull the valet arms 13 upwardly during the unfolding process, and onto which hangers can be hung. As can be seen more clearly in FIGS. 22-23, the valet arm sleeve 14 is designed to be a simple elongated hollow tube, annular in cross section, with a diameter larger than that of the valet arms 13 so that the valet arms 13 can slide within it, but smaller than that of the stopping flange 15.

During non-storage operation, the platform plates 25 provide for the placement of a hand held laundry basket full of soiled or clean and folded clothes, and the valet arms 13 provide an area for hanging freshly laundered clothing on hangers. By means of the casters 100, the entire unit can transport clothes on hangers and clothes in a laundry basket to any desired location.

As shown in FIGS. 24-29, the collapsible valet cart 10 is designed to also include a removable table top 50 which can be stored on the hanging pins 60 of the front vertical support tubes 11. The removable table top 50 can be pulled off of the handing pins 60 and used as a flat folding surface or a serving table top by placing it on top of the front and rear support tubes 11, 12 when the valet arms 13 are in a stored position. The removable table top 50 is essentially rectangularly shaped with an upper flat surface 51, a front wall 55, a rear wall 53 opposite thereto, a right wall 52 and a left wall 54, opposite thereto, and a recessed bottom surface 57 opposite the upper flat surface 51. The recessed bottom surface 57 includes four rounded hollow apertures 56, located proximately at the corners, which are designed for storing it when not in use by mating and reliable engagement with the hanging pins 60 of the front vertical support tubes 11.

Figure 9:
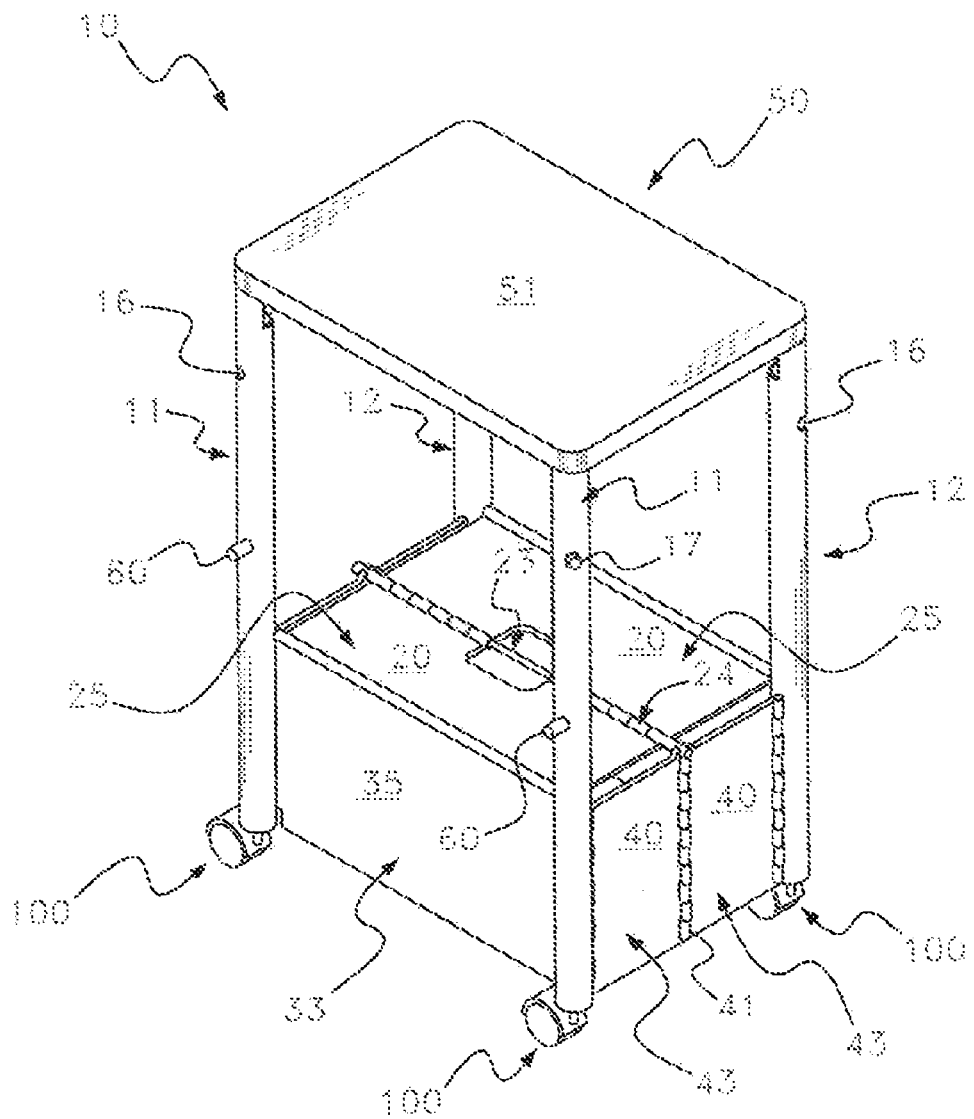
FIG. 9 is a perspective view of the collapsible valet cart showing the table top in place on top.
Figure 10:
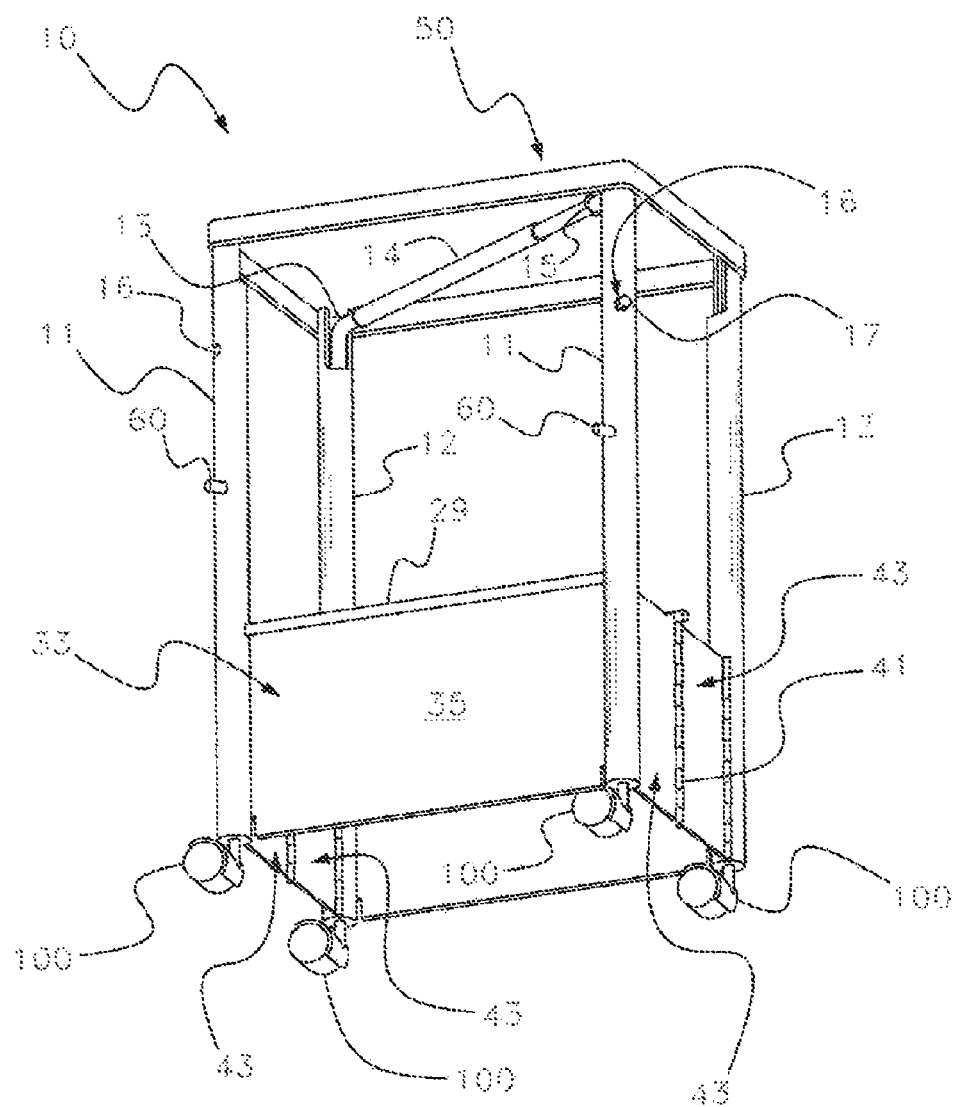
FIG. 10 is a bottom perspective view of the collapsible valet cart showing the table top in place on top.

As shown in FIGS. 9-10, the removable table top 50 can be placed and used as a top surface of the collapsible valet cart 10. To do so, the valet arm 13 is pushed downwardly into the vertical support tubes 11, 12, by pressing the button clip 17 into the valet arm 13 to release the valet arm 13 from its retraced, stable position until the valet arm stoppingly engages with the valet cut outs 110 of each vertical support tube 11, 12. The removable table top 50 can then be simply pulled off of the hanging pins 60 and placed on top of the vertical support tubes 11, 12 and over the stored valet arm 13.

As can be seen in FIG. 10, when in a non-stored position, either using the extracted valet arm 13 or alternatively the removable table top 50, the collapsible valet cart 10 has an open bottom that allows for the cart to be folded or collapsed for easy storage.

FIGS. 11-17 illustrate how the collapsible valet cart 10 can be compactly stored when the laundry capability is not required. Once the button clip 17 is released, the valet arms 13 are telescoped downwardly by pushing them into the vertical support tubes 11, 12 using the valet arm sleeve 14. The platform plate hinge pin 23 can then be pulled upwardly causing upward hinged movement of the platform plates 25 as well as rotation of the side walls 43 toward a center line along the corresponding hinges to fold the collapsible valet cart 10 into a flattened configuration.

While there has been described herein the preferred embodiment of this invention, it will be obvious to those skilled in the art that various other embodiments, changes, equivalents, and modifications may be made therein without departing from the spirit of scope of this invention. It is therefore aimed to cover all such changes, equivalents, and modifications as fall within the spirit and scope of the invention.

For example, the removable table top 50 could be configured to include a raised lip on its top surface to serve as a serving tray. The telescoping valet arms could be locked into an upright, stable position by a number of alternate means such as a removable pin that passes completely through the frame legs by milling a second aperture opposite the button tab aperture illustrated herein. The vertical support tubes 11, 12, the platform plate pins 36 and the front and rear walls 33 can be redesigned to have the platform plate pins 36 and the front and rear walls 33 matingly secure to the vertical support tubes 11, 12 without penetrating the hollow interior of the vertical support tubes 11, 12 thereby allowing for deeper depth for storage, and for height adjustable telescoping valet arms 13. Welding or the use of an adhesive are also envisioned.

Another embodiment envisions designing the front and rear walls 33 to attach to the vertical support tubes 11, 12 by means of notched hook structures on the sides walls 27, 28 of the front and rear walls 33 that would matingly and removably engage with hook cut outs on the vertical support tubes 11, 12.

The invention is not limited in its application to the details of construction and to the arrangements of the components set forth in the description above or illustrated in the drawings. The invention is capable of other embodiments and of being practiced and carried out in various ways. It is to be understood that the terminology employed herein is for the purpose of the description and should not be regarded as limiting.

We claim:

1. A collapsible valet cart comprising:
    a frame including two front vertical tubes, two rear vertical tubes, a front wall, a rear wall opposite thereto, a left wall, and a right wall opposite said left wall, wherein said front vertical tubes and said rear vertical tubes each include an upper end with a valet arm cut out, and a lower end, wherein each of said lower ends include a channel cut out on an inner surface, a platform pin hole located proximately above said channel cut out, and a hinge located proximately on a front surface, wherein said front wall removably affixes to said front vertical tubes by slidingly engaging with said channel cut outs, said rear wall removably affixes to said rear vertical tubes by slidingly engaging with said channel cut outs, and wherein said left and right walls each include a plurality of hinges for rotatingly affixing to one of said hinges of said front vertical tubes and one of said rear vertical tubes;

a basket platform consisting of two platform plates each including elongated channels at a first edge and plate hinges at a second edge opposite said channels, wherein said platform plates are hingedly affixed to each other at said plate hinges by means of a platform hinge pin, and wherein said platform plates are rotatingly affixed to said front vertical tubes and said rear vertical tubes by means of platform rods wherein each of said platform rods slidingly engages through said elongated channels and into said platform pin holes of said front and said rear tubes;

a telescoping valet arm wherein said telescoping valet arm is substantially U-shaped and wherein said valet arm slidingly engages with one of said front vertical tubes and one of said rear vertical tubes;

a removable table top for placement over said front vertical tubes, said rear vertical tubes when said telescoping valet arm is depressed downwardly for storage into said valet arm cut outs of said front vertical tubes and said rear vertical tubes;

and a plurality of wheels located at said lower ends of said of said front vertical tubes and said rear vertical tubes for rolling transportation;

wherein said collapsible valet cart can be hingedly collapsed and folded by upward pulling of said platform hinge pin.

2. The collapsible valet cart of claim 1 wherein said left wall and said rear wall each consists of a pair of wall plates which are hingedly attached to each other for collapsible folding of said collapsible valet cart 3. The collapsible valet cart of claim 1 wherein said telescoping valet arm consists of an annular sleeve and a pair of annular L-shaped rods with a vertical rod and a horizontal rod.

4. The collapsible valet cart of claim 3 wherein each of said vertical rods of said telescoping valet arm includes a circumferential flange uniformly molded onto each of said vertical rods to create a stop for clothes hangers that are placed onto said telescoping valet arms for the hanging of clothing.

5. The collapsible valet cart of claim 1 including a pair of button clips, wherein said front and said rear vertical tubes each include a tube button clip hole, said telescoping valet arm includes a pair of valet arm clip holes, and wherein each of said button clips is affixed within said telescoping valet arm and extends outwardly through one of said valet arm clip holes and one of said tube button clip holes for temporary and stable extraction of said valet arm and wherein each of said button clips can be depressed for insertion of said valet arm into one of said front vertical tubes and one of said rear vertical tubes for placement of said removable table or for collapsible, compact folding of said collapsible valet cart.

6. The collapsible valet cart of claim 1 wherein each of said vertical support tubes includes a uniformly molded post for hanging said removable table top when said table top is not in use.

* * * * *